US 8,478,572 B2

(12) United States Patent
Kubli et al.

(10) Patent No.: US 8,478,572 B2
(45) Date of Patent: Jul. 2, 2013

(54) METHOD AND SYSTEM FOR PROCESSING AND DISPLAYING SHEET-METAL-FORMING SIMULATION PARAMETERS

(76) Inventors: Waldemar Kubli, Neerach (CH); Andreas Krainer, Baden (AT)

( * ) Notice: Subject to any disclaimer, the term of this patent is extended or adjusted under 35 U.S.C. 154(b) by 430 days.

(21) Appl. No.: 12/948,555

(22) Filed: Nov. 17, 2010

(65) Prior Publication Data
US 2012/0123747 A1 May 17, 2012

(51) Int. Cl.
*G06G 7/48* (2006.01)
(52) U.S. Cl.
USPC ............................................................ 703/7
(58) Field of Classification Search
USPC ........... 703/2, 7, 8; 700/97, 145, 146; 73/767, 73/826; 72/57
See application file for complete search history.

(56) References Cited

U.S. PATENT DOCUMENTS

| | | | |
|---|---|---|---|
| 6,227,023 B1 * | 5/2001 | Daehn et al. | 72/57 |
| 6,353,768 B1 * | 3/2002 | Karafillis et al. | 700/97 |
| 8,249,837 B1 * | 8/2012 | Prabhu et al. | 703/2 |
| 8,296,110 B2 * | 10/2012 | Nagai et al. | 703/8 |
| 2006/0287755 A1 * | 12/2006 | Kubli et al. | 700/145 |
| 2007/0251327 A1 * | 11/2007 | Broene | 73/769 |
| 2008/0004850 A1 * | 1/2008 | Wang | 703/13 |
| 2009/0056468 A1 * | 3/2009 | Kubli et al. | 73/826 |

FOREIGN PATENT DOCUMENTS
WO   WO-2010-033929   3/2010

OTHER PUBLICATIONS

Schneider et al., "Validation and optimization of numerical simulations by optical measurements of tools and parts", International deep drawing Research Group, Juine 2008.*

"Siemens PLM Software NX 7.0", Develop3d Magazine, print issue, Nov. 2009; online version available as of Mar. 30, 2011 at http://develop3d.com/reviews/siemens-plm-software-nx-7.0.

Kaulich, Christoph and Wenzlaff, Michael, "IndiForm—Eine intuitive Bedienoberfläche für die industrielle Umformsimulation" ("IndiForm—An intuitive graphical user interface for industrial simulation of forming operations"), LS-DYNA Forum, Bamberg 2010, Metallumformung III, GNS mbH, published in Bamberg, Germany; online version available as of Mar. 30, 2011 at http://www.dynamore.de/dokumente/papers-1/2010-deutsches-forum/papers/C-III-03.pdf?set_language=de.

Anderson, Taylor, "Automating the Design Validation Process with NX Check-Mate", Desktop Engineering, vol. 14, Issue 9, May 2009; online version available as of Mar. 30, 2011 at http://www.deskeng.com/articles/aaapyy.htm.

(Continued)

*Primary Examiner* — Kandasamy Thangavelu
(74) *Attorney, Agent, or Firm* — Albert Haegele; Leyendecker & Lemire, LLC (57) ABSTRACT

In a method for the numerical simulation of sheet-metal-forming processes, forming simulation parameters are visually displayed by:
   maintaining active values of the simulation-program-control parameters and standard values of the parameters that can be, used as a reference;
   determining a status of each parameter as being "noncompliant" if and only if the active value of the parameter is not equal to the standard value of the parameter;
   grouping parameters into display groups, and determining the status of a display group as being "noncompliant" if and only if the status of at least one of the parameters or other display groups assigned to the display group is "noncompliant";
   displaying GUI elements showing the active values of the parameters, and GUI elements associated with a display group; and
   displaying, for each of the GUI elements, a visual indication of the status of the corresponding parameter or display group.

15 Claims, 3 Drawing Sheets

OTHER PUBLICATIONS

NX Checker, Siemens PLM Software, 2008; online version available as of Mar. 30, 2011 at http://www.plm.automation.siemens.com/de_de/Images/checker_tcm73-62406.pdf.

etaDYNAFORM User's Manual Version 5.5, Chapter 8, Engineering Technology Associates, Inc., Troy, Michigan (US), 2006; online version available as of Mar. 30, 2011 at http://www.dynamore.de/documents/manuals/eta-dynaform-manuals/archiv/dynaform-5.5-user-manual?set_language=en.

Miller, B. and Bond, R., "The practical use of simulation in the sheet metal forming industry", Wilde FEA Ltd., 2001, XP002621095; online version available as of Mar. 30, 2011 at http://citeseerx.ist.psu.edu/viewdoc/summary?doi=10.1.1.118.813.

Shi X et al., "Simulation of sheet metal forming by a one-step approach: Choice of element", Journal of Materials Processing Technology 20010117 Elsevier Science S.A., vol. 108, No. 3, Jan. 17, 2001, pp. 300-306, XP002621096, DOI: DOI:10.1016/S0924-0136(00)00846-3.

Wang Y, et al., "Research on applying one-step simulation to blank design in sheet metal forming", Journal of Materials Processing Technology 20020115 Elsevier Ltd GB, vol. 120, No. 1-3, Jan. 15, 2002, pp. 111-114, XP002621097, DOI: DOI:10.1016/S0924-0136(01)01197-9.

European Search Report No. EP 10 40 5221, Feb. 8, 2011, Munich, Germany.

European Search Report No. EP 10 40 5222, Feb. 8, 2011, Munich, Germany.

* cited by examiner

METHOD AND SYSTEM FOR PROCESSING AND DISPLAYING SHEET-METAL-FORMING SIMULATION PARAMETERS

CROSS-REFERENCE TO RELATED APPLICATIONS

U.S. patent application Ser. No. 12/948,531, entitled "Method and System for Designing a Formed Sheet-Metal Part", and U.S. patent application Ser. No. 12/948,581, entitled "Method and Computing System for Designing a Sheet-Metal-Forming Process", each having at least one common inventor with this patent application, and being commonly owned with this patent application, were filed concurrently with this patent application, and accordingly, are incorporated by reference herein for all purposes.

BACKGROUND

Formed metal parts and in particular formed sheet-metal parts are manufactured in multi-component forming presses by deep drawing, restriking, folding, trimming, etc., involving different forming tools.

For the configuration of sheet-metal-forming tools (for example, punches, dies, and blank holders), as well as for the configuration of metal forming processes (for example, tool forces, draw beads, lubrication, shape, and material for the sheet-metal blank), CAD/CAE (computer aided design/computer aided engineering) programs are utilized. These simulate and model, respectively, a metal forming process by means of finite elements on the basis of simulation parameters. Simulation parameters describe
  the geometry or shape of the forming tools utilized in the metal forming process,
  process parameters or metal forming parameters, such as the lubrication, processing forces, drawbeads, etc.
  material parameters of the material being formed, such as thickness, rolling direction, elastic properties, yield and hardening behaviour, physical characteristics etc.

The simulation programs create, by numerical simulation, result values comprising a description of the geometry of a sheet-metal part after the forming process as well as the distribution of state variables, such as elongations and stresses in the formed sheet-metal part. They also may calculate, from the result values, values of certain characteristic variables, called performance variables, which express a quality of the formed sheet-metal part. Different types of performance variables and visual representations of the result values and performance variables can be computed and displayed in a post-simulation analysis. Correspondingly, further sets of parameters are used to control the numerical simulation itself (control parameters) and to control different types of post-simulation analysis (analysis parameters).

There is a need to provide users with assistance in performing standardized simulations and analysis of the results. For these purposes, it is known to provide users with default values for parameters, or to load given sets of parameters ("user configurations") and it is also known, from other domains, to enforce user input into so-called "required" fields. However, such existing approaches do not sufficiently alleviate the problems encountered when handling large numbers of parameters in an effort to enforce standardized procedures in a multi-user, multi-company setting.

BRIEF SUMMARY

Many of the embodiments described herein are generally directed to a method and apparatus for the numerical simulation of sheet-metal-forming processes of the type mentioned initially, which overcomes the disadvantages mentioned above.

In a method for the numerical simulation of sheet-metal-forming processes, performed by a processor of a computing system by means of a simulation program wherein the numerical simulation and further aspects of the operation of the simulation program are controlled by a set of sheet-metal-forming simulation parameters, the method for displaying the sheet-metal-forming simulation parameters comprises the steps of:
  maintaining in computer storage a set of active values of the parameters, controlling the operation of the simulation program;
  maintaining in computer storage a data set defining standard values of the parameters, used as a reference;
  maintaining in computer storage a set of type flags indicating, for each of the parameters, whether the parameter is of type "standard" or "nonstandard";
  maintaining in computer storage data representative of one or more display groups, each display group having assigned to it one or more parameters or other display groups;
  the processor determining, for each of the parameters, a status of the parameter, the status being either "compliant" or "noncompliant", the status being "noncompliant" if and only if the parameter is of type "standard" and the active value of the parameter is not equal to a standard value of the parameter, as defined by the data set defining standard values for this parameter;
  the processor determining, for each of one or more display groups, the status of the display group, the status being "noncompliant" if and only if the status of at least one of the parameters or other display groups assigned to the display group is "noncompliant" (This is logically equivalent to determining the status as being "compliant" if and only if the status of all parameters and other display groups assigned to the display group is "compliant");
  displaying, in a graphical user interface (GUI) being displayed on a display device of the computing system, at least one of
    GUI elements showing the active values of the parameters, and
    GUI elements associated with a display group;
  displaying, in the GUI, for each of the GUI elements, a visual indication of the status of the corresponding parameter or display group.

The sheet-metal-forming simulation parameters, or simply parameters, preferably comprise one or more of the following sets of parameters:
  Simulation parameters, which in turn preferably comprise one or more of the following sets of parameters:
  geometry of tools and/or parts
  process parameters of the process being simulated
  material parameters
  Simulation parameters may include nominal parameters and additional parameters defining a stochastic variation around the nominal parameters. Simulation parameters may be classified as being controllable or noncontrollable, i.e. disturbances.
  Control parameters (of numerical simulation).
  Analysis parameters for post-simulation analysis.

The parameters involved in the method may be all forming simulation parameters, or at least a subset of all forming simulation parameters. The parameters can be—depending on their meaning and context—of different types, such as numeric, logical, symbolic, text string, etc., as scalars or as arrays, and have corresponding values.

Whereas the active values (of scalar parameters or of entries in an array) are single values, used to control the operation of the simulation program, the data set defining standard values of the parameters can, for each parameter, define either a single value as well, or a range of values, or a test procedure. As long as the active value of a parameter is equal to the standard single value, or falls within the standard range of values, or satisfies the test procedure, it is considered to be standard. A test procedure can be a program subroutine associated with the parameter that takes a value as an input and returns a Boolean value indicating whether the value is standard. The test procedure may, when performing the test, take the active and/or standard values of other parameters into account. This allows the system to perform consistency checks involving two or more parameters.

In an embodiment, the method comprises the step of displaying, in the GUI, for each of the parameters, in association with the GUI element that shows the value of the parameter, a visual indication of the type of the parameter. This allows for a quick, convenient visual check whether one or more parameters of a set of parameters being displayed are of the type "standard" or "nonstandard". The normal GUI that is used in operation of the simulation program is preferably used, making it easier for the user to orient herself in the various display elements such as screens, windows, panels, tabs, menus, drop-down lists, etc. . . . into which the GUI display of the parameters may be organized.

In an embodiment, the method comprises the step of accepting a user input indicating a display group, and displaying parameters and/or other display groups assigned to the display group indicated by the user input. A display group may be, for example, a frame, window, panel, tab, drop-down list, etc., with the parameters being displayed and editable by means of, for example, GUI elements such as text boxes, list boxes, drop-down-lists, combo boxes, radio buttons, check boxes, datagrids, etc . . . . The input device typically is a pointing device such as a computer mouse, trackball, tablet or touch screen.

In an embodiment, the method comprises the step of maintaining in computer storage a further set of parameter values, the values being default values of the parameters, and, if one parameter is not defined by the set of active values, setting its value to the default value. This allows, given an incompletely defined set of active values, to give all parameters a sensible value. For example, a user may define or import values for a subset of parameters, and use, for the remaining parameters, the default values.

In another embodiment, a single set of parameters is used to represent both standard values and default values. Each parameter is associated with a flag indicating whether its value is a default value or a "dual-purpose" value for this parameter. If it is a default value, the corresponding parameter's active value may be set to this default value in an initialization phase or later, upon user input. If it is a "dual-purpose" value, the value can be used both as a default value and also as a standard value. As described above, using the value as a standard value means that it defines a reference against which an active value is checked, as. Consequently, when a default value is changed later on, e.g. by the user, this has no further effect on its status. However, when a parameter's value is changed from the default value which also is the standard value, the associated status changes to "noncompliant".

In an embodiment, the method comprises the step of, in response to a user command, setting standard values to be equal to the corresponding active values and exporting, to a computer-readable data file, to be stored on a computer-readable medium, a representation of the standard values. Alternatively, the active values whose type indicates that they are standard values are exported as standard values (or as "dual-purpose" values), and optionally remaining values are exported as default values. This allows:

in one variant, the system to save a particular set of values as standard values, to be used as a starting point for other simulations. Only a subset of parameter values may be exported and subsequently imported as active values, and then be combined with default values, as described above.

in another variant, the system to use the saved set of values as standard values; that is, as a reference for checking a set of active values at a later time or at another location, as explained in connection with the importing step described below.

If the simulation configuration whose active values are being exported does not define the complete set of parameters, then the values for undefined parameters can be retrieved from stored standard values and used in the exporting step.

The export of the standard values may be performed by the simulation program itself, or by a separate program which reads at least the active values and type flags from a file generated by the simulation program, or receives them from the simulation program by an interprocess communication channel. In an embodiment, the separate program comprises all or a subset of the standard values as part of the program itself, and exports them together with zero or more of the active values. In an embodiment, the separate program accepts a user input defining at least one parameter value and an associated type flag and exports them in the same way.

In an embodiment, the method comprises the step of importing, from a computer-readable data file stored on a computer-readable medium, a representation of the data set defining standard values, and importing, from a different computer-readable data file, a representation of the active values, and subsequently performing the steps specified above for determining and displaying the status of the parameters and display groups.

This allows a user to establish a standard for simulation and/or analysis runs, and to check existing parameter sets for adherence to the standard. In a typical setting, a manufacturer; e.g., an automobile manufacturer; defines how numerical simulations for the forming of parts made by a subcontractor should be performed. For this purpose, the manufacturer generates, in his copy of the simulation program and in the manner described above, a data file defining standard values. The data file is sent to the subcontractor which then imports the data file into his copy of the simulation program. The subcontractor can use the parameters as defined by the data file as a starting point for his simulations of the forming process for the part. The results of the subcontractor's simulations, together with the parameters used in those simulations, is sent back to the manufacturer. The manufacturer imports the results into his copy of the simulation tool, thereby setting the active parameters to the values of the parameters used in the simulations. In order to check whether the parameters used by the subcontractor adhere to the standard defined by the manufacturer, the manufacturer imports the original data file defining standard values. The program then determines whether the active parameters adhere to the standards defined by the original data file and displays the status of the parameters accordingly. Thanks to the inventive highlighting of the status (compliant/noncompliant) of each parameter or groups of parameters, the manufacturer can easily, within the same GUI of the simulation tool, check whether the simulations parameters are compliant, and which of them, if any, are not.

Optionally, in an initialization step, the processor imports a representation of the standard values and sets the active values of the parameters to be equal to the imported standard values. That is, the standard values are used as default values.

In brief, the above process involves, at the manufacturer, the steps of
- importing, from one or more computer-readable data files stored on a computer-readable medium, result data representing the results of a numerical simulation of a sheet-metal-forming process, and active value data representing a set of active values of the parameters used in performing the same numerical simulation;
- importing, from one or more further computer-readable data files stored on a computer-readable medium, a representation of a data set defining standard values, that can be used as a reference;
- automatically determining, for parameters and display groups, the status;
- displaying in the GUI, the parameters and display groups along with their status;
- displaying, in the GUI, as part of the normal operation of the simulation tool, a graphical representation of the result data. Typically, this is a 2D projection of a 3D view of the formed part, along with additional information visualizing the result data.

In an embodiment, the method comprises the step of, in response to a user command, replacing the data set defining standard values by loading from a computer-readable data file, stored on a computer-readable medium, a representation of a different data set defining standard values, recomputing the status of the parameters and display groups, and updating, for each of the GUI elements displayed, the visual indication of the status of the corresponding parameter or display group. This allows a user to verify whether an existing active data set; e.g., after modification by the user; is compliant with one or more given standards.

In an embodiment, the method comprises the step of, in response to a user command, and for each or for a subset or a single one of the parameters, setting the active value to be equal to a corresponding standard value. This allows a user to force an active value to be compliant with the standard. For example, a single parameter may be set by means of a context menu associated with the GUI element displaying the parameter.

In an embodiment, the set of parameters is divided into several subsets of parameters, for example, one or more of a first subset comprising control parameters defining the numerical simulation parameters, a second subset comprising analysis parameters defining a post-simulation analysis of the numerical simulation, a third subset comprising geometry and process parameters, and a forth subset comprising material parameters. This allows a user to apply the steps as explained in the above; e.g., for the import, export, comparing, and setting equal of parameter values; selectively for one or more subsets of the parameters.

In an embodiment, a computer program product for the simulation of sheet-metal-forming processes is loadable into an internal memory of a digital computer or a computer system, and comprises computer-executable instructions to cause one or more processors of the computer or computer system execute the simulation method. In another embodiment, the computer program product comprises a computer-readable medium having the computer-executable instructions recorded thereon. The computer-readable medium preferably is non-transitory; that is, tangible. In still another embodiment, the computer program is embodied as a reproducible computer-readable signal, and thus can be transmitted in the form of such a signal.

Nothing in the above brief summary is intended to limit the scope of the patent claims, or limit the scope of the balance of this specification.

BRIEF DESCRIPTION OF THE DRAWINGS

The subject matter of the invention will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
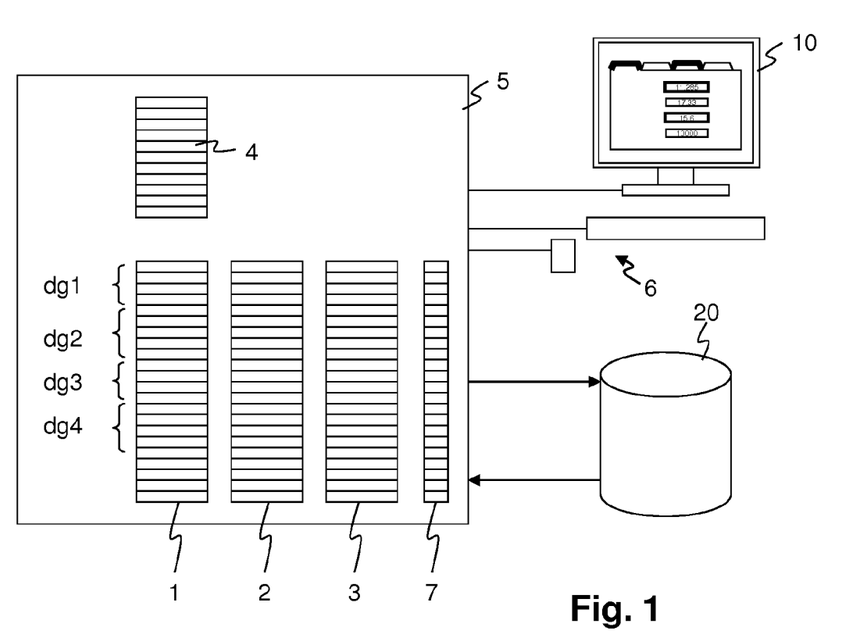
FIG. 1 schematically shows a structure of an embodiment of a sheet-metal-forming parameter simulator system.

FIG. 1 schematically shows a structure of an embodiment, with a processing unit 5 operatively coupled to a display 10 and a persistent storage unit 20, as well as input devices 6 such as a keyboard and/or pointing device, such as a computer mouse. The processing unit 5 comprises a processor and random access memory. It is programmed to perform numerical simulation of sheet-metal-forming operations, with the simulation being controlled by a set of parameters. The processing unit 5 maintains, in random access memory or in persistent storage, three sets of parameter values which often, but not necessarily, differ from one another. A first set of values of these parameters, called active parameter values 1, is used when performing the numerical simulation. A second set called standard parameter values 2 is used as a reference. A third set, which may be optional, called default parameter values 3, is used when values in the other sets are not defined. Alternatively, each member of the second set is associated with a flag 7 which indicates whether the member is to be used a standard parameter or a default parameter.

Each set may be subdivided into subsets, called storage groups, comprising different types of parameters such as simulation, control, and analysis type parameters. Each storage group can preferably be imported (retrieved from persistent storage) and exported (stored to persistent storage) and managed independent from the others. Alternatively or additionally, active parameter values and/or the standard parameter values are stored together with other simulation data in a single file. In another embodiment, the standard values are stored as part of the simulation program or in a separate file.

Each parameter is associated with a Boolean type flag, of a stored set of type flags 7, indicating whether the parameter is of type "standard" or "nonstandard". The parameters, and correspondingly also the parameter sets, are assigned to display groups dg1-dg4. Each display group dg1-dg4 defines parameters and/or other display groups that are displayed together in a graphical user interface (GUI) rendered on the display 10. Each display group dg1-dg4 is associated with a label stored in a list of display group labels 4.

In a generalized implementation, some or all of the standard parameter values are replaced by a definition of a parameter range, or even more general, by a test procedure that, given a parameter, determines whether it is compliant or not.

Figure 2:
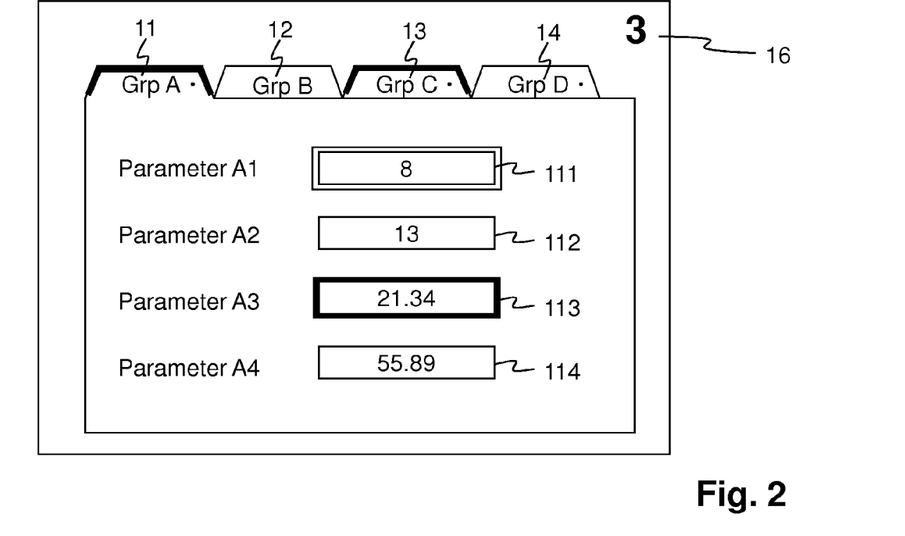
FIG. 2 shows an example of part of a GUI in a first state.
Figure 3:
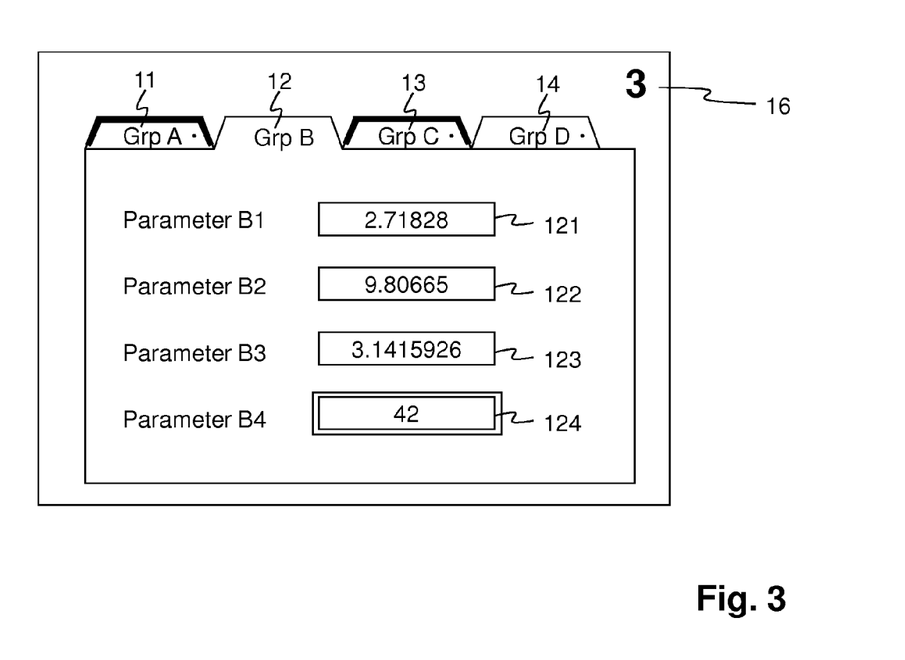
FIG. 3 shows the same part of the GUI depicted in FIG. 2 in a second state.

FIG. 2 shows an example of part of a GUI in a first state, and FIG. 3 the same part of the GUI in a second state. The part of the GUI is arranged in a subwindow or pane 16 of the display 10 and comprises four tabs 11-14 labeled "Grp A" through "Grp D". The pane itself is labeled with the number "3". In FIG. 2, the contents of the first tab 11 are shown comprising text boxes 111-114, each showing and preferably allowing a user to edit a value of a parameter, and each being associated with a label "Parameter A1" through "Parameter A4". Similarly, in FIG. 3, the second tab 12 with text boxes 121-124, each associated with one of labels "Parameter B1" etc. is shown. For each tab 11-14, the set of parameters shown on the tab constitutes a display group. The label "Grp A" through "Grp D" of the tab is the GUI element associated with a display group. Naturally, in an actual implementation, the tabs and parameters will be labeled according to the nature of the parameters. Other GUI elements (not shown in the figures) indicating and allowing selection of the values of parameters may be check boxes, radio buttons, etc.

Usually, the values shown by the GUI elements are the active values, which are used when performing the simulation. In an embodiment, the user may choose to display the standard or the default values instead. In another embodiment, standard and/or default values are displayed as a tool tip or in a property dialog.

For each parameter that is a standard parameter, according to the associated type flag 7, the status is determined by comparing the value of the active parameter with the associated value of the set of standard parameter values 2. In a more general implementation, this comparison is replaced by a check whether the active value is within a range specified by a definition of standard values, or by executing a test procedure associated with the parameter. In any case, the status is determined as being "compliant" or "noncompliant". The status is displayed by a visual indication associated with the display of the parameter. In the present example, this is done by a thick line around the text box signifying "noncompliant", as for the box labeled 113 in FIG. 2.

A visual indication of the type of the parameter ("standard" or "nonstandard") is preferably also displayed. In the present example, this is done by a second thin line around the text box, as for the boxes labeled 111 and 124 in FIGS. 2 and 3, respectively.

Both for the type and for the status, the way in which this visual indication is effected
- can take one or more of many forms, such as variation of color, texture, line thickness, font, font characteristics (bold, underline, caps), addition of graphical symbols such as a small dot included in a text box or next to a label or text box, etc., and
- can be tied to elements such as
  - the characters of the text in the text box (or next to a radio button or check box), and/or
  - the text box frame, and/or
  - the label associated with the text box, and/or
  - the background color and texture of any of these elements, and/or
  - a GUI element associated with a single parameter or a group of parameters, wherein the GUI element is logically but not graphically associated with the parameters. For example, the GUI element is displayed in another area of the display as the parameter, but shows the name of the parameter.

The visual indication can be arranged to indicate by highlighting only the nonstandard and/or the noncompliant parameters, or vice versa, only the standard and/or compliant parameters.

For each group of parameters such as a tab, the status of the display group is determined as being "noncompliant" if at least one member of the display group is "noncompliant". The status of the display group is visually indicated in association with a label or other graphical element that represents the display group. In the present example, this is done with a thicker border of the respective tab. Thus, in FIG. 2 it is immediately evident that not only the visible first tab 11 comprises noncompliant elements, but also the third tab 13.

A display group dg1-4 may have not only parameters but also other display groups assigned to it, and so the one-step hierarchy (based on tabs) shown is preferably extended to a multi-level hierarchy. For example, one of the tabs may comprise further tabs, or the whole of FIGS. 2 and 3 may be part of one subwindow or pane of a group of panes of which only one is displayed at a time, according to user selection. The GUI element allowing for the selection of these windows is also associated with a status, and has its status displayed. Thus the status is propagated and made visible recursively upwards through a hierarchy of display groups.

Figure 4:
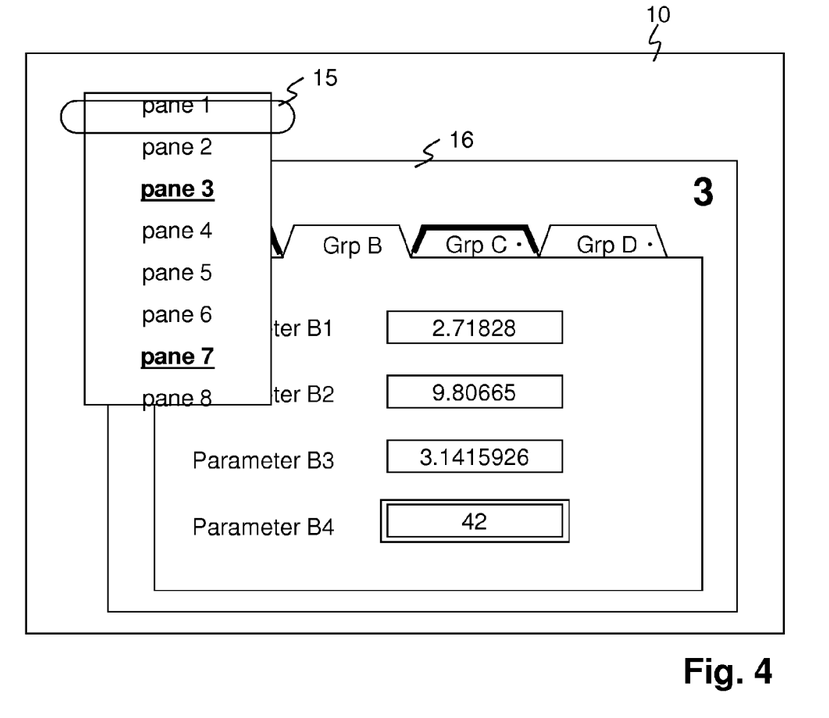
FIG. 4 shows a higher level display comprising the GUI of FIGS. 2 and 3.

In the present example, FIG. 4 shows the pane 16 of FIGS. 2 and 3 being displayed on the display 10, with a drop-down list 15 configured to allow selection of the pane from a plurality of panes, each pane corresponding to a display group. The drop-down list is shown in its extended state. The labels "pane 1" through "pane 8" shown in the list are associated with a visual indication of the status of the corresponding display group or pane. In the present case, this is done by bold, underlined characters for the label, indicating that "pane 3" and "pane 7" are noncompliant.

Figure 5:
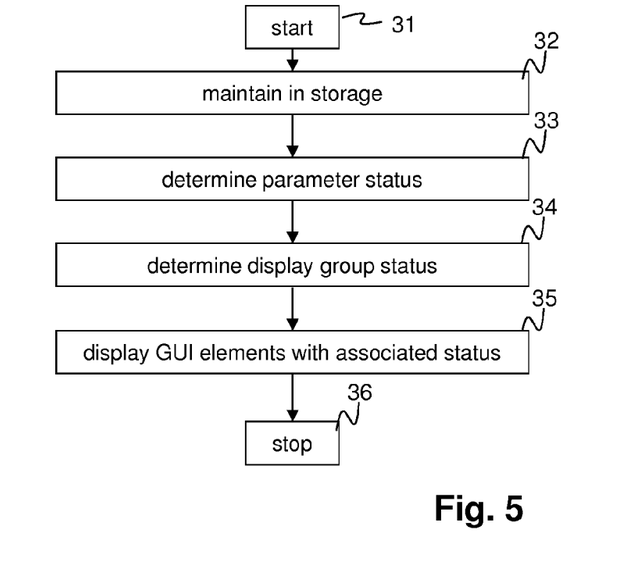
FIG. 5 shows a flow diagram of an embodiment of a sheet-metal-forming parameter-simulation process.

FIG. 5 shows a flow diagram of an embodiment: Following a start and initialization step 31, the computing system maintains in computer storage (step 32) the set of active values of the parameters, the data set defining standard values, the set of type flags in storage, and the data representative of one or more display groups; such that part or all of this data is ready for retrieval and processing. In step 33, the processor determines, for each of the parameters, the status. In step 34, the processor determines for each of one or more display groups, the status of the display group. In step 35, the processor determines a visual representation of GUI elements for parameters, display groups and their status, and causes the display device to display them.

Some of the steps can be repeated at a later time, for example, when the user extends the simulation by activating or incorporating modules that involve further forming simulation parameters. Then these parameters are also initialized to their standard or default values, and their status is determined, etc., as described above.

While the invention has been described in present embodiments of the invention, it is distinctly understood that the invention is not limited thereto, but may be otherwise variously embodied and practiced within the scope of the claims.

LIST OF DESIGNATIONS 1 active parameter values
2 standard parameter values
3 default parameter values
4 display group labels
5 processing unit 6 input device
7 type flags
10 display
11 first tab
12 second tab
13 third tab
14 fourth tab
15 drop-down list
16 sub window, pane
111-114 parameter edit (display and entry) fields of first tab
121-124 parameter edit fields of second tab
20 persistent storage
dg1-4 display groups

What is claimed is:

1. In a method for the numerical simulation of sheet-metal-forming processes, performed by a processor of a computing system by means of a simulation program wherein the numerical simulation and further aspects of the operation of the simulation program are controlled by a set of sheet-metal-forming simulation parameters, a method for displaying the sheet-metal-forming simulation parameters, the method comprising the steps of:
maintaining in computer storage a set of active values of the parameters, controlling the operation of the simulation program;
maintaining in computer storage a data set defining standard values of the parameters, used as a reference;
maintaining in computer storage a set of type flags indicating, for each of the parameters, whether the parameter is of type "standard" or "nonstandard";
maintaining in computer storage data representative of one or more display groups, wherein each display group has assigned to it one or more parameters or other display groups;
by the processor, determining, for each of the parameters, a status of the parameter, wherein the status is either "compliant" or "noncompliant", the status being "noncompliant" if and only if the parameter is of type "standard" and if and only if the active value of the parameter is not equal to a standard value of the parameter, as defined by the data set defining standard values for the parameter;
by the processor, determining for each of one or more display groups the status of the display group, wherein the status is "noncompliant" if and only if the status of at least one of the parameters or other display groups assigned to the display group is "noncompliant";
displaying, on a display device of the computing system, in a graphical user interface (GUI), at least one of
graphical user interface elements showing the active values of the parameters, and
graphical user interface elements associated with a display group; and
displaying, on the display device of the computing system, in the graphical user interface, for each of the graphical user interface elements, a visual indication of the status of the corresponding parameter or display group.

2. The method of claim 1, further comprising the step of displaying on the display device, in the graphical user interface, for each of the parameters, in association with the graphical user interface element that shows the value of the parameter, a visual indication of the type of the parameter.

3. The method of claim 1, further comprising the step of, by the processor, accepting a user input indicating a display group, and displaying parameters and/or other display groups assigned to the display group indicated by the user input.

4. The method of claim 2, further comprising the step of, by the processor, accepting a user input indicating a display group, and displaying parameters and/or other display groups assigned to the display group indicated by the user input.

5. The method of claim 1, further comprising the steps of:
maintaining in computer storage parameter values that are to be used as default values of the parameters,
either by using a single set of parameters to represent both standard values and default values and by associating each parameter with a flag indicating if its value is to be used only as a default value or as a "dual-purpose" value, that is, both as a default value and as a standard value;
or by maintaining, in addition to the set defining standard values, a further set of parameter values to be used as default values of the parameters; and
if one parameter of the set of active values is not defined, setting its value to the default value.

6. The method of claim 1, comprising the step of, by the processor, in response to a user command,
either: exporting, to a computer-readable data file, active values whose type indicates that they are standard values, as standard values, and optionally exporting remaining values as default values,
or: setting standard values to be equal to the corresponding active values and exporting, to a computer-readable data file, a representation of the standard values.

7. The method of claim 1, further comprising the steps of:
by the processor, importing from one or more computer-readable data files stored on a computer-readable medium a representation of the data set defining standard values;
importing, from one or more different computer-readable data files stored on a computer-readable medium a representation of the active values; and
subsequently performing the steps specified in claim 1 for determining and displaying the status of the parameters and display groups.

8. The method of claim 1, further comprising the steps of:
by the processor, importing from one or more computer-readable data files stored on a computer-readable medium a representation of the data set defining standard values;
by the processor, setting the active values of the parameters to be equal to the imported standard values;
by the processor, in response to a user command, modifying at least one of the active values; and
subsequently performing the steps specified in claim 1 for determining and displaying the status of the parameters and display groups.

9. The method of claim 1, further comprising the steps of:
by the processor, in response to a user command, replacing the data set defining standard values by loading from one or more computer-readable data files stored on a computer-readable medium a representation of a different data set defining standard values;
re-computing the status of the parameters and display groups, and
for each of the GUI elements displayed, updating the visual indication of the status of the corresponding parameter or display group.

10. The method of claim 1, further comprising the step of, by the processor, in response to a user command and for each or for a subset or a single one of the parameters, setting the active value to be equal to a corresponding standard value.

11. The method of claim 1, wherein the set of parameters is divided into several subsets of parameters, the subsets of parameters comprising at least one of a first subset comprising control parameters defining the numerical simulation parameters, a second subset comprising analysis parameters defining a post-simulation analysis of the numerical simulation, a third subset comprising geometry and process parameters, and a forth subset comprising material parameters.

12. In a method for the numerical simulation of sheet-metal-forming processes, performed by a processor of a computing system by means of a simulation program wherein the numerical simulation and further aspects of the operation of the simulation program are controlled by a set of sheet-metal-forming simulation parameters, a method for displaying the sheet-metal-forming simulation parameters, the method comprising the steps of:

importing, from one or more computer-readable data files stored on a computer-readable medium, result data representing the results of a numerical simulation of a sheet-metal-forming process and active value data representing a set of active values of the parameters used in performing the same numerical simulation;

importing, from one or more further computer readable data files stored on a computer-readable medium, a representation of a data set defining standard values, that can be used as a reference;

maintaining in computer storage a set of type flags indicating, for each of the parameters, whether the parameter is of type "standard" or "nonstandard";

maintaining in computer storage data representative of one or more display groups, each display group having assigned to it one or more parameters or other display groups;

by the processor, determining for each of the parameters a status of the parameter, the status being either "compliant" or "noncompliant", the status being "noncompliant" if and only if the parameter is of type "standard" and if and only if the active value of the parameter is not equal to a standard value of the parameter, as determined by the set defining standard values for the parameter;

by the processor, determining for each of one or more display groups the status of the display group, the status being "noncompliant" if and only if the status of at least one of the parameters or other display groups assigned to the display group is "noncompliant";

displaying on a display device of the computing system, in a graphical user interface (GUI), at least one of
    graphical user interface elements showing the active values of the parameters, and
    graphical user interface elements associated with a display group;

displaying on the display device, in the graphical user interface, for each of the graphical user interface elements, a visual indication of the status of the corresponding parameter or display group; and displaying on the display device, in the graphical user interface, a graphical representation of the result data.

13. A non-transitory computer-readable medium comprising computer-executable instructions which, when executed by a processor of a computing system, cause the computing system to perform the method steps of one of claims 1 to 12.

14. A computer system programmed to perform the method steps of one of claims 1 to 12.

15. A method of manufacturing a non-transitory computer-readable medium, comprising the step of storing, on the computer-readable medium, computer-executable instructions which, when executed by a processor of a computing system, cause the computing system to perform the method steps of one of claims 1 to 12.

* * * * *